UNITED STATES PATENT OFFICE.

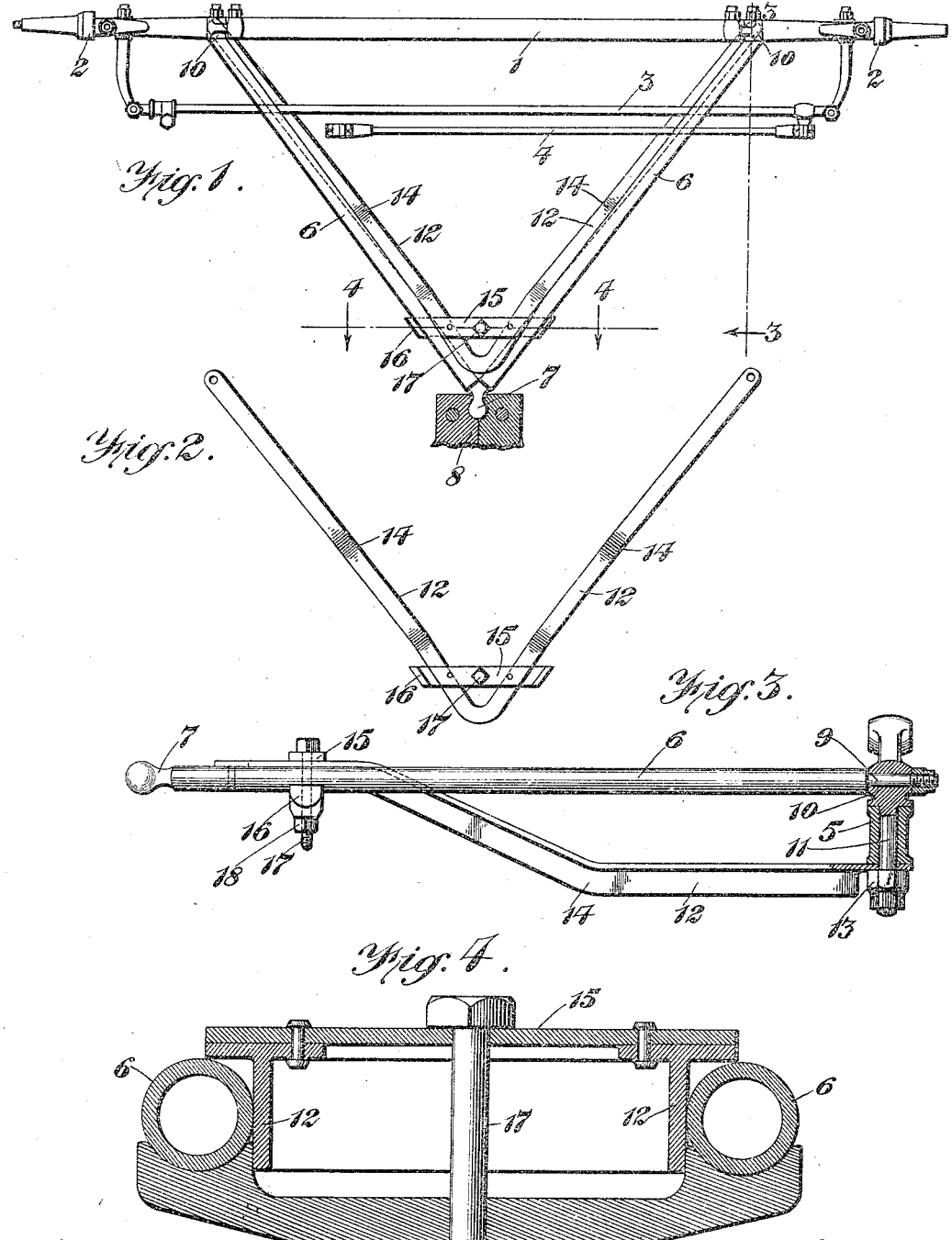

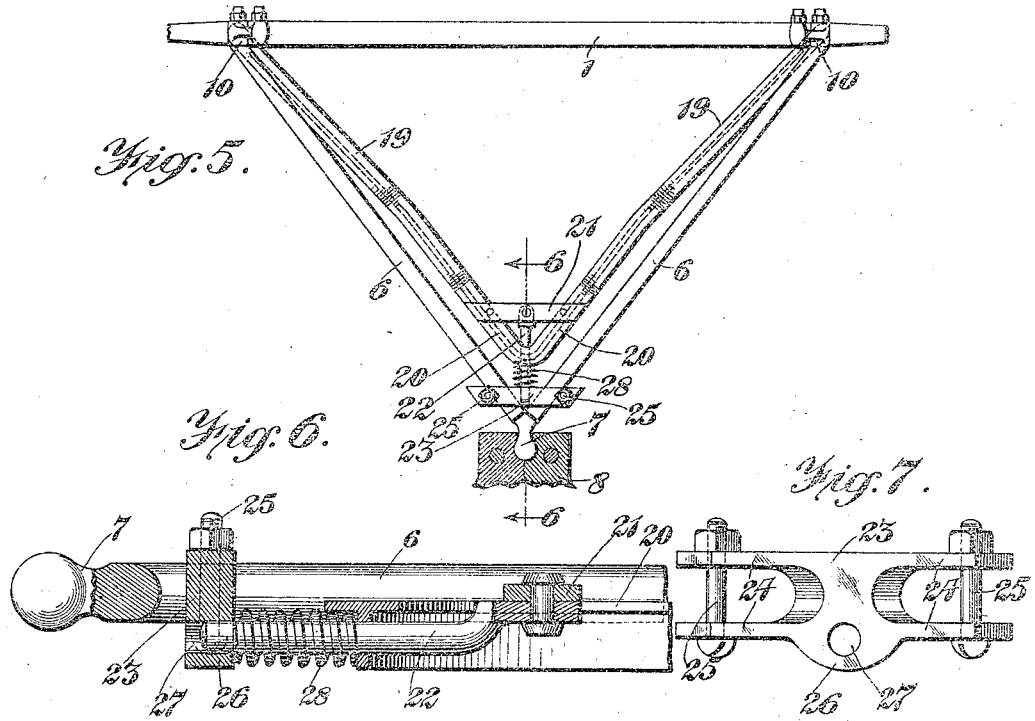
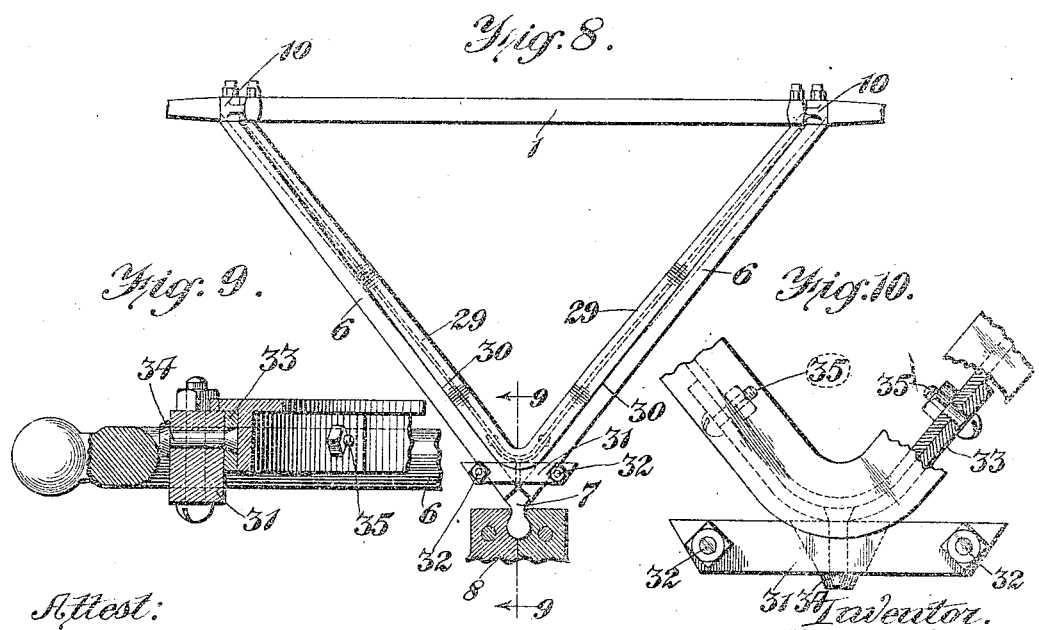

ADOLPH R. BROCKSMITH, OF ST. LOUIS, MISSOURI.

RADIUS-ROD SUPPORT.

1,230,106.

Specification of Letters Patent.

Patented June 19, 1917.

Application filed January 16, 1915. Serial No. 2,589.

*To all whom it may concern:*

Be it known that I, ADOLPH R. BROCKSMITH, a citizen of the United States, residing at the city of St. Louis and State of Missouri, have invented a new and useful Radius-Rod Support, of which the following is a specification.

This invention relates to supports or braces for the radius rods in connection with the front axles of vehicles, and it consists of reinforcing supports or braces having their front portions connected with the axle, and their rear portions connected with the radius rods, whereby bending of the radius rods is prevented.

An object of the invention is to provide a brace or support for the radius rods whose forward ends are attached to the upper side of the axle, comprising a metallic bar connected to the axle below the end of each of the radius rods and extending rearwardly upwardly and having its rear portion supported approximately in the same horizontal plane with the rear portions of the radius rods, and an improved clamp device in connection with the radius rods for holding said bar in position.

Another object is to provide a type of brace or support for the radius rods whose forward ends are connected to the upper side of the axle, comprising a bar connected to the lower side of the axle below each of the radius rods and extending rearwardly and upwardly between the radius rods, in combination with a combined buffer and support for supporting the said support or brace in position to prevent bending of the radius rods, and a yielding shock absorbing device between said buffer and the rear portion of said bar.

Another object is to provide an improved brace or support for the radius rods whose front ends are connected to the upper side of the vehicle, comprising a bar which is angular in cross section having its front portion connected to the axle below each of said radius rods, and extending upwardly and rearwardly between said radius rods, a supporting buffer clamped upon and extending between said radius rods, and means for holding said bar permanently in engagement with said buffer, whereby the stresses and forces received by the radius rods will also be received by said bar, thus preventing damage to or bending of the radius rods.

Other objects of a specific nature will appear from the following detailed description, reference being made to the accompanying drawings in which I have illustrated my invention, and in which—

Figure 1 is a plan view of the axle and radius rod structure of a vehicle having my improved support or brace in combination therewith.

Fig. 2 is a plan view of the support or brace detached from the axle and radius rod structure.

Fig. 3 is a sectional view of the axle along the line 3—3 of Fig. 1, illustrating the radius rods and the support or brace in side elevation, Fig. 4 is an enlarged sectional view on the line 4—4 of Fig. 1 illustrating the devices by which the rear portion of the supporting and bracing bar is clamped in engagement with the radius rods. Fig. 5 is a plan view of a modified form of the invention, in which a shock absorbing device is placed between the rear upper portion of the bracing bar and the buffer attached to the rear portions of the radius rods. Fig. 6 is an enlarged sectional view on the line 6—6 of Fig. 5. Fig. 7 is a rear side elevation of the buffer device illustrated in Figs. 5 and 6 detached from the radius rods. Fig. 8 is a plan view of a modified form of the invention in which the rear portion of the supporting and bracing bar is rigidly secured to the buffer which is in rigid engagement with the radius rods. Fig. 9 is an enlarged sectional view on the line 9—9 of Fig. 8. Fig. 10 is an enlarged plan view of the rear portion of the bracing bar and the buffer in rigid connection therewith.

The axle and radius rod structure in combination with which I have illustrated my present invention, and with which the invention coöperates, includes the axle 1 provided with pivoted mountings 2 for the wheels, said mountings being connected by a rod 3 whereby they may be moved in unison by operation of the actuating member 4. It will be understood that these devices constitute a part of the usual steering mechanism of the vehicle. The axle 1 is provided with an enlargement 5 near each end thereof, and a vertical hole is formed through each of said enlargements.

The rear ends of the radius rods 6 are connected with a union 7 having ball portions formed on its rear extremity which is seated within a socket formed in connection with the vehicle frame. The radius rods diverge toward their forward ends, and the extremities thereof are in the form of reduced portions 9 which extend through holes in brackets 10 above the axle body 1. The brackets 10 have depending portions 11 passing through the holes in the enlargements 5 of the axle, as illustrated in Fig. 3.

The support or brace which I have combined with the structure above described comprises, preferably, a bar which is T-shaped in cross section, and which is bent to provide two diverging arms 12. The extremities of the arms 12 are placed below the axle body 1, the depending portions 11 of the brackets 10 passing through the holes in said arms. The lower ends of the depending portions 11 are threaded and receive the clamping nuts 13, by which the brackets 10 and the radius rods 6 and the bracing bar are rigidly held in connection with the axle. The arms 12 extend rearwardly in a plane substantially parallel with the plane in which the radius rods are mounted for approximately one-half their length and, at points indicated at 14, said arms are deflected obliquely upwardly and toward each other so that they may pass between the radius rods. As illustrated the arms 12 pass between the radius rods and bear against the inner sides thereof at a suitable distance in front of the union 7. The arms 12 are so formed that the upper flange thereof bears against the upper surfaces of the radius rods for some distance in front of the union 7, provision being thus made whereby the stresses and forces exerted upon the radius rods will be imparted directly upon the arms 12.

The arms 12 of the supporting and bracing bar are rigidly retained in the adjustment described. A metallic connection 15 is secured to and connects the two arms 12 above the radius rods. A bracket 16 has a rounded notch adjacent to each end thereof in which the radius rods are seated, said bracket being positioned below the radius rods and in the same vertical plane with the connection 15. The different parts are clamped in this position by means of a bolt 17 passing through holes in the connection 15 and the bracket 16, and provided with a nut 18 which is operable in connection with the bolt effectively to clamp the several parts rigidly together, so that the connection 15 and bracket 16 will support the bracing bar in connection with the radius rod and constitute a buffer between the crotch of the bracing member and the radius rod.

From the foregoing it will be understood that the forces and stresses exerted upon the radius rods will be imparted directly to the arms of the supporting and bracing bar, thus greatly strengthening and reinforcing the radius arms. The advantages of the specific form of arms which I have employed for the purpose of supporting and bracing the radius arms are obvious, it being apparent that this type of bar is of maximum strength. Also the type of connections whereby the bar may be secured in connection with the vehicle axle and the radius rods is very simple and efficient. The device may be readily applied in connection with the axle and radius rod structure of existing vehicles without the necessity of displacing any of the usual parts in the vehicles, and without the necessity of expensive special equipment for perfecting the combination.

The modification which I have illustrated in Figs. 5, 6 and 7 will be readily comprehended from a brief description, in view of the above complete description of the invention illustrated in Figs. 1 to 4, inclusive. The structure of the axle 1, the radius rods 6, the union 7 and the bracket braces 10 are the same as above described. The supporting and bracing bar and its connection with the radius rods whereby the stresses and forces exerted upon the radius rods are imparted to the supporting and bracing bar, are different in this embodiment from the structure of such parts described above. The supporting and bracing bar includes two diverging arms 19 the extremities of which are attached to the lower side of the axle 1 in the same manner that the extremities of the arms 12 are attached to the axle. The rear portions 20 of the supporting and bracing arms are raised and extend for some distance between and parallel with the radius rods, and said raised portions are connected by a bridge member 21. A rod 22 has its front end rigidly attached to the bridge 21, said rod extending rearwardly through a hole in the depending flange of the bar. A buffer member 23 is positioned between the radius rods and has laterally extending arms 24 above and below said radius rods, the outer extremities of which have clamping bolts 25 passing therethrough for the purpose of securing the buffer member in position. The buffer member 23 is provided with a depending portion 26 having a hole 27 which receives the rear end of the rod 22. Thus the rear portion of the supporting and bracing member is permanently supported in its proper raised position, so that the forces and stresses exerted upon the radius rods may be received by the supporting and bracing bar. For the purpose of receiving the forces and stresses and absorbing them without violence to any of the rigid parts I provide a strong coil spring 28 which encircles the rod 22 between the bracing bar and the buffer 23, said spring being under compression, so that considerable pressure is constantly exerted thereby, as between the radius rods and the supporting and bracing bar.

The advantages of this structure are apparent, since the provision of the shock absorbing device will prevent violence to any of the rigid parts.

The modification of the invention illustrated in Figs. 8, 9 and 10 consists in providing a supporting and bracing bar composed of two arms 29 formed similar to the arms 12 and being connected with depending portions of the brackets 10 below the axle 1 in the manner described. The rear portions of the arms 29 are raised above the radius rods, said arms bearing against the inner sides of the radius rods at the points 30. A buffer member 31 which is similar to the buffer member 23, with the exception that said member 31 is not provided with a depending portion, is secured between the rear ends of the radius rods by bolts 32 which perform the same functions as the bolts 25 above described. An arcuate strap 33 is rigidly attached to the buffer member 31 by a connection 34 passing through said buffer member and through said strap. The arms of said strap bear against the depending flange of the T bar of which the arms 29 is composed, in the manner illustrated in Figs. 9 and 10. Said strap is detachably secured to the depending flange of said bar by removable bolts or screws 35 passing through holes in said strap and said flange. By this structure a rigid abutment is provided between the supporting and bracing bar and the radius rods so that all the stresses and forces exerted upon the radius rods are immediately transmitted to the bracing bar.

Having described my invention what I claim and desire to secure by Letters Patent is:

1. The combination with an axle, a support, two radius rods connected to said support and diverging toward their forward ends, and brackets connected to the upper side of the axle and to the ends of said radius rods, of a V-shaped bar having the ends of the arms thereof attached to the under side of the axle below the ends of said radius rods and having the apex thereof between said rods, flanges on said bar adjacent to the apex thereof bearing upon said radius rods, and a clamping device holding said bar between said radius rods and the flanges of said bar upon said radius rods.

2. The combination with an axle body, a support, two radius rods having their ends connected to said support and diverging toward said axle body, brackets connected to the ends of said radius rods and mounted upon said axle body, and depending portions on said brackets projecting through said axle body and extending below the lower side thereof, of a V-shaped bar, elements holding the extremities of said V-shaped bar in engagement with the depending portions of said brackets against the under side of said axle body below the ends of said radius rods, the apex of said V-shaped bar extending between said radius rods adjacent to said support, flanges on said bar bearing upon the upper sides of said radius rods, a metallic connection connecting the arms of said V-shaped bar, a bracket bearing against the sides of said radius rods, and a member connecting said connection and said bracket effectively to hold the flanges of said bar upon said radius rods and hold said bracket against the under sides of said radius rods.

3. The combination with an axle body, a support, and two radius rods having adjacent ends connected to said support and diverging toward said axle body, of a V-shaped bar having its ends against the under side of said axle body below the ends of said radius rods, elements connecting said radius rods and said bars and holding the ends of said radius rods above said axle body and the ends of said bar against the under side of said axle body, flanges adjacent to the apex of said bar bearing upon said radius rods, flanges on said bar bearing against the inner sides of said radius rods, and a releasable clamp device binding said bar in connection with said radius rods as aforesaid.

4. The combination with an axle body, a support, and two radius rods having adjacent ends connected to said support and diverging toward said axle body, of a V-shaped T bar, elements binding the ends of said bar against the under side of said axle body and holding the ends of said radius rods above said axle body, a buffer device supported by said radius rods adjacent to said support, a raised portion on said T bar extending between and bearing against said radius rods adjacent to said buffer device, and means connecting said buffer device and said bar.

5. The combination with an axle body, a support, two radius rods having adjacent ends connected to and diverging from said support toward said axle body, and a buffer element secured between said radius rods, of a V-shaped T bar having its ends below said axle body, elements fastening the ends of said radius rods above said axle body and the ends of said T bar below said axle body and below the ends of said radius rods, a raised portion on said V-shaped T bar between said radius rods, and means connecting said raised portion to said buffer device.

6. The combination with a V-shaped radius rod for motor vehicles, the crotch of said radius rod having a swivel connection with a fixed part of the motor vehicle and having its legs connected to the top of the front axle, of a V-shaped sub-radius rod having its ends connected to the axle, a raised portion on the sub-radius rod extending between and bearing against the inner sides of the legs of the first-named radius rods, whereby the sub-radius rod braces the first-named radius rod from bending inwardly.

7. The combination with a V-shaped radius rod for motor vehicles, the crotch of said radius rod having a swivel connection with a fixed part for the motor vehicle and having its legs connected to the top of the front axle, of a V-shaped sub-radius rod having its ends connected to the under side of the axle; a raised portion of the sub-radius rod extending between and bearing against the inner sides of the legs of the first-named radius rod and also bearing against one of the horizontal sides of the first-named radius rod whereby the sub-radius rod braces the first-named radius rod from bending inwardly and vertically.

In witness whereof, I have signed this specification in the presence of two subscribing witnesses.

ADOLPH R. BROCKSMITH.

Witnesses:
 R. M. LAWRENCE,
 S. CLARE.